United States Patent Office 3,035,914
Patented May 22, 1962

3,035,914
PREVENTION OF CYAN DYE FADING IN COLOR DEVELOPED PRINTS AND FILMS
Willy A. Schmidt, Munich Solln, Germany, and Betty L. Downey, Binghamton, N.Y., assignors to General Aniline & Film Corporation, New York, N.Y., a corporation of Delaware
No Drawing. Filed Feb. 18, 1959, Ser. No. 793,961
6 Claims. (Cl. 96—55)

This invention relates to color photography and in particular to a method and means for inhibiting the fading of cyan dyes in color photographic materials in which color images have been formed by color development with a primary amino developing agent.

This application is a continuation-in-part of our application Serial No. 633,397, filed January 10, 1957, now abandoned.

It is pointed out, in co-pending U.S. application Serial No. 633,398, filed January 10, 1957, by Bates, Johnson, and Tritten, entitled "Prevention of Cyan Dye Fading in Color Developed Prints and Films," that the tendency to fade of cyan dye images formed by color development of a multilayer color material containing a phenolic coupler in the red sensitive layer can be greatly inhibited by subjecting said color material during processing to a bath containing water-soluble salts of magnesium, calcium or cadmium. Thus, said application indicates that after the processing of multicolor materials, each layer of which contains a color former rendered fast to diffusion by virtue of a long aliphatic chain including color development, bleaching, fixing, washing, and rinsing in a bath containing one of the above salts, it was found that the resulting color photograph showed a high resistance to cyan dye fading or discoloration. This protection is achieved without affecting the original color balance.

It has now been found that superior stabilization of such color developed prints and transparencies may be effected by interpolating during processing, at any point after color development, a rinsing step employing a solution of a high molecular weight cationic nitrogenous resin in combination with any of the aforesaid metal salts or water-soluble metal salts of zinc and strontium. The enhancement of the cyan dye stabilization by the resin, when used in combination with these metal salts, may possibly be due to the known ability of resins of this type to form metal complexes. However, this tentative explanation is only theoretical and we do not wish to be held or bound in any manner thereby.

The nitrogenous resins used in this invention are known substances and are described in U.S. Patents 2,322,333; 2,631,920; 2,440,988, 2,405,863, 2,526,106, 2,364,726 and 2,106,938 and are prepared by condensing formaldehyde or a substance capable of generating formaldehyde with dicyandiamide, dicyandiamidine, guanidine, biguanide, biuret or melamine in the presence of a catalyst such as ammonium chloride. These resins are available on the market in one form under the trademark "Solidogen" and may be purchased either in a solid state or as aqueous solutions of various concentrations. One such product particularly suitable for our use is known as "Solidogen" LT–13 which is a 35% solution, by weight, of one of the aforesaid resins in water.

It is, therefore, an object of the present invention to provide a method for preventing the fading and degradation of cyan dyes in colored photographic prints and transparencies, wherein the dyes are formed from oxidized color developer and a phenol color former containing a long aliphatic chain.

A further object is to provide a composition which will function to prevent cyan dye fading in such color developed prints and transparencies.

These objects are accomplished by either washing or bathing the color developed prints or transparencies at any point after color development in a bath containing:
(1) A water soluble salt of calcium, magnesium, cadmium, zinc or strontium such as their chlorides, acetates, nitrates, bromides or borates and the like; and
(2) A high molecular weight cationic nitrogenous resin constituted as aforesaid.

Generally, the quantities of metal salts vary from about 2.0 g. to about 30.0 g. per liter of solution. In the case of the resin, the range is from about 3.5 to about 35.0 g. per liter of solution. A 1:1 ratio of salt to resin produces excellent stabilization of the cyan dye images. Moreover, best results ensue when the resin is of the type obtained from formaldehyde, dicyandiamide and ammonium chloride in combination with a water-soluble salt of zinc, i.e., zinc acetate.

The cyan dye stabilizing bath of the present invention can be used to process a variety of photographic multicolor materials in which the dyestuff images are processed with nondiffusing color formers present in the emulsion. Said photographic multicolor materials include color reversible film, color negative film, color reversible white printing material coated on an opaque base and color positive printing material coated on paper. The multilayer color reversible film containing color formers may be prepared by the methods described in U.S. Patents 2,179,228; 2,179,239; 2,186,849 and 2,220,-187 and consists of an integral tripack emulsion coated on the usual clear film base. Each of the emulsions is sensitized to one of the primary colors, namely, blue, green and red. Usually, the top layer is blue sensitive. The filter layer, yellow in color and blue absorbing, lies beneath the top layer. Below the said filter layer lies a green sensitive emulsion layer, and below this is a red sensitive emulsion layer.

Each of the three emulsion layers contains a dye forming compound fast to diffusion which, during the development of a silver image by an aromatic amino developing agent, forms with the oxidation product of said developing agent, a cyan quinoneimine from a phenol coupler in the red sensitive layer, a yellow azomethine from an open chain ketomethylene coupler in the blue sensitive layer, and a magenta azomethine from a pyrazolone coupler in the green sensitive layer. Generally, the developed dye image is complementary in color to the color for which the emulsion layer is sensitized. A combination of these three printing primaries results in production of all the various hues and shades in the finished film or print.

It is to be understood, however, that the process or method of stabilizing cyan dye images herein described is equally applicable to multilayer coatings wherein the three emulsion layers are arranged differently than as above described. Thus, equally good results are obtained with multilayer material, particularly for making transparencies in which the layer arrangement involves the blue sensitive layer at the bottom, the green sensitive layer at the top, and the red sensitive layer between the blue and green. The same is true of multilayer material having a white opaque base in which the layer arrangement reading from the bottom is blue, green and red sensitive. It is, therefore, not our intention to limit our invention to the conventional blue, green and red sensitive multipacks.

After color development, it is necessary to remove the silver which is also formed during development. This is accomplished by use of a bleach such as acidified alkali permanganate or alkali dichromate solutions which convert the metallic silver into a water-soluble silver salt or by other bleach solutions which transform the metallic silver into a silver salt which is soluble in fixer solutions, particularly sodium thiosulfate solutions. Certain bleach solutions of the second type include those which contain a halide and an oxidizing agent such as an alkali ferricyanide, a cupric salt or an alkali dichromate.

The colored negative film is identical to the color reversible film with the exception that the former may contain an anti-abrasion layer or clear gelatin over the blue sensitive upper layer. The color reversible white opaque material is made in the same manner as the color reversible film and the color negative film with the exception that an opaque white pigment is incorporated into the film base. The positive color paper is also identical to the color reversible film and the color negative film with the exception that a baryta coated paper base is used to hold the emulsion. The above-described negative, positive and reversible materials also differ as to the relative speed and contrast of the individual emulsion layers and of the multilayer color materials. Preparation of photographic multilayer materials containing specific color formers fast to diffusion have been described in the literature pertaining to color photography and are therefore not herein described.

It has been indicated that the particular point in processing, at which our rinse bath is employed, is not critical so long as it follows color development. However, we have found it more advantageous to use the rinse bath as one of the final steps in the processing of the color material.

The following examples describe in detail the methods for carrying out the above objects of this invention but it is to be understood that they are inserted merely for the purpose of illustration and are not to be construed as limiting the scope of the invention.

*Example I*

| | | |
|---|---|---|
| Cationic resin from formaldehyde, dicyandiamide and ammonium chloride | ml | 30.0 |
| Zinc acetate (2H$_2$O) | g | 10.0 |
| Reaction product of a phenol with ethylene oxide as per U.S.P. 2,213,477 | ml | 0.5 |
| Water to make liter | | 1.0 |

Color transparencies made as above are treated for 5 minutes in the above bath, followed by a 5 minute water wash. In the case of prints from the material sold by the Ansco Division of General Aniline & Film Corporation under the trademark "Printon," a 2 minute wash is sufficient in the above solution and no final water wash is necessary.

*Example II*

| | | |
|---|---|---|
| Cationic resin from formaldehyde, dicyandiamide and ammonium chloride | ml | 15.0 |
| Cadmium nitrate | g | 5.0 |
| Reaction product of a phenol with ethylene oxide as per U.S.P. 2,213,477 | | 0.5 |
| Water to make liter | | 1.0 |

Color prints and transparencies are treated in this solution as in Example I.

*Example III*

| | | |
|---|---|---|
| Cationic resin from formaldehyde, dicyandiamide and ammonium chloride | ml | 15.0 |
| Strontium nitrate | g | 5.0 |
| Reaction product of a phenol with ethylene oxide as per U.S.P. 2,213,477 | ml | 0.5 |
| Water to make liter | | 1.0 |

Color prints and transparencies are treated in this solution as in Example I.

*Example IV*

| | | |
|---|---|---|
| Cationic resin from formaldehyde, dicyandiamide and ammonium chloride | ml | 10.0 |
| Zinc acetate (2H$_2$O) | g | 5.0 |
| Reaction product of a phenol with ethylene oxide as U.S.P. 2,213,477 | ml | 0.5 |
| Formalin (40%) | ml | 3.75 |
| Water to make liter | | 1.0 |

Colored prints and transparencies are treated in this solution as in Example I.

The function of the reaction product of the phenol with ethylene oxide as per U.S.P. 2,213,477 is that of a surface active agent and insures even wetting of photographic prints and transparencies after removal from the treating solutions.

We claim:

1. In the process of producing stabilized color photographic images in a photographic material comprising a support and at least one light-sensitive silver halide emulsion containing a phenolic color former fast to diffusion, capable of forming, upon development with a primary amino developer, a cyan quinonimine dye image by exposing said multilayer material, color developing, bleaching, fixing, washing and drying the same, the improvement which comprises avoiding cyan dye fading by rinsing the said material at any point after color development with an aqueous solution containing about 2.0 g. to about 30.0 g. per liter of a water-soluble salt of a metal selected from the class consisting of calcium, strontium, magnesium, zinc and cadmium, in combination with a cationic water-soluble high molecular weight nitrogenous resin obtained by the condensation in the presence of ammonium chloride of formaldehyde with a member selected from the class consisting of dicyandiamide, dicyandiamidine, guanidine, biuret, and biguanide wherein the concentration of said high molecular weight nitrogenous resin varies from 3.5 g. to about 35.0 g. per liter.

2. A process according to claim 1 wherein said metal salt is a water-soluble salt of calcium.

3. A process according to claim 1 wherein said metal salt is a water-soluble salt of magnesium.

4. A process according to claim 1 wherein said metal salt is a water-soluble salt of strontium.

5. A process according to claim 1 wherein said metal salt is a water-soluble salt of zinc.

6. A process according to claim 1 wherein said metal salt is a water-soluble salt of cadmium.

References Cited in the file of this patent

UNITED STATES PATENTS

| | | |
|---|---|---|
| 1,898,709 | Belfet | Feb. 21, 1933 |
| 1,925,914 | Zanker | Sept. 5, 1933 |
| 2,207,442 | Ripper | July 9, 1940 |
| 2,662,071 | Elod | Dec. 8, 1953 |
| 2,688,546 | Scott | Sept. 7, 1954 |
| 2,706,687 | Rees et al. | Apr. 19, 1955 |
| 2,788,274 | Ranger | Apr. 9, 1957 |
| 2,913,338 | Bates et al. | Nov. 17, 1959 |

FOREIGN PATENTS

| | | |
|---|---|---|
| 659,362 | Great Britain | Oct. 24, 1951 |